Feb. 16, 1932.  H. T. THOMAS  1,844,991
VIBRATION DAMPER
Filed Aug. 8, 1927
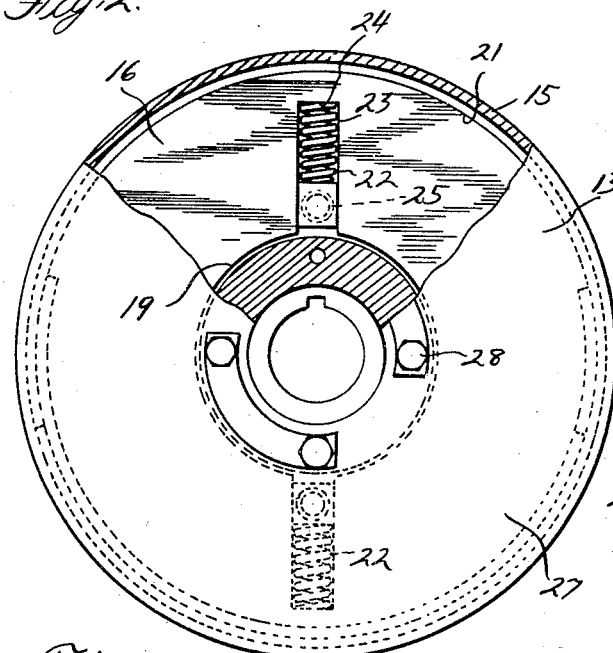
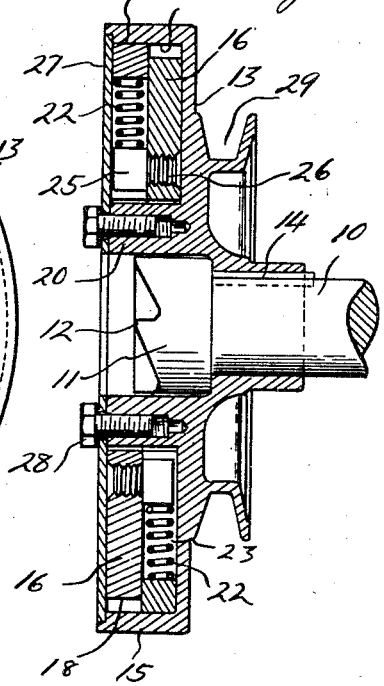
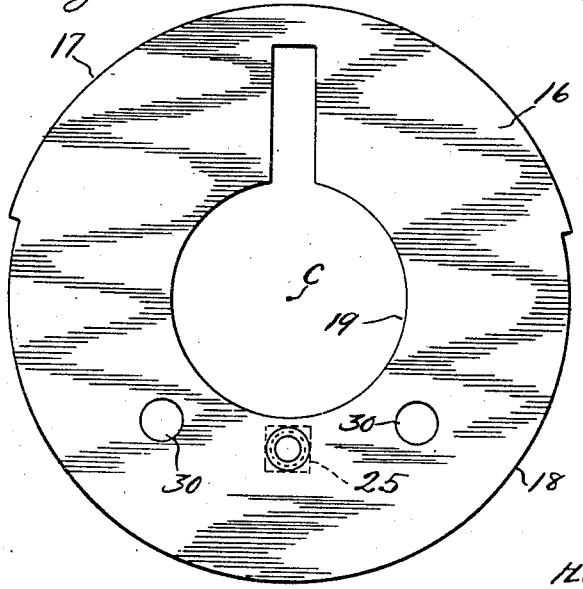
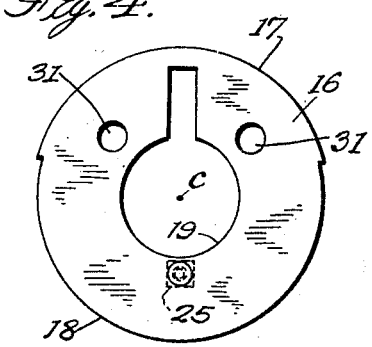
Inventor
Horace T. Thomas Patented Feb. 16, 1932

1,844,991

UNITED STATES PATENT OFFICE

HORACE T. THOMAS, OF LANSING, MICHIGAN, ASSIGNOR TO REO MOTOR CAR COMPANY, OF LANSING, MICHIGAN, A CORPORATION OF MICHIGAN

VIBRATION DAMPER

Application filed August 8, 1927. Serial No. 211,599.

This invention relates to vibration damping devices and more particularly to improvements in devices of this character tending to simplify, render more efficient and improve the same generally.

The invention relates to vibration dampers generally and more particularly to dampers of this character finding particular utility when used in connection with internal combustion motors wherein they are employed to dampen out the torsional vibrations of the crank shaft.

In some types of vibration dampers the inertia elements are centered by being loosely fitted at their center upon a shaft and allowed to rotate about this center. However, considerable difficulty has been experienced and trouble frequently develops due to the fact that wear takes place at this center support which in time creates a chatter.

It is, therefore, one of the primary objects of this invention to provide a vibration damping device in which this difficulty is eliminated. I therefore propose constructing the device so that the inertia elements are centered at their outside periphery rather than at the center and to provide resilient means acting normally to urge these inertia elements in a radial direction to hold the peripheries in frictional engagement with a member fixed to rotate with the crank shaft. As a consequence of this construction any wear occasioned either to the member carried by the crank shaft or to the inertia members is compensated for and liability of the same becoming loose and chattering is eliminated. With my proposed construction it is also possible to take advantage of centrifugal force to either increase or decrease the friction between the inertia members or discs and the driving member on the crank shaft and to so regulate the extent to which this centrifugal force acts as to produce the smoothest action. Springs or other resilient means are provided for normally urging the inertia members radially outwardly and I propose so locating the centers of gravity of these inertia members that the centrifugal force, acting when the crank shaft is rotated, tends to aid the spring action or oppose the same as the speed of the crank shaft varies thus giving an extremely wide range of friction adjustment.

The several objects, advantages and novel details of construction of one embodiment of this invention will be further amplified and enlarged upon as this description proceeds, especially when considered in connection with the accompanying drawings wherein:

Figure 1 is a vertical sectional view through a vibration damper constructed in accordance with this invention.

Figure 2 is a front elevation of the structure illustrated in Figure 1, certain parts being broken away for the sake of clearness, and Figure 3 is an elevational view of one of the inertia elements.

Figure 4 is a view similar to Figure 3, on a reduced scale, showing a slight modification of one of the inertia elements.

Referring now more particularly to the drawings wherein like reference characters indicate like parts it will be noted that there is fragmentarily illustrated a shaft 10 which may be the crank shaft of an internal combustion engine. The end of the shaft 10 may be provided with a nut 11 having teeth or jaws 12 adapted for engagement with the starting crank of the motor.

The reference character 13 indicates generally the driven member of the damper and as illustrated is in the form of a housing or casing keyed or otherwise fixed as at 14 for rotation with shaft 10. The driven member 13 is formed with a laterally or axially extending wall or flange 15.

Arranged within the housing formed by the driven member 13 is a pair of inertia elements 16. While these members may be of any desired form they are herein illustrated as being of disc-like configuration and each provided with a peripheral portion 17 of greater radius than the remaining peripheral portion 18. Each inertia element is provided with a center aperture or opening 19 of sufficient size to clear a center hub portion 20 of the driven member 13. A pair of inertia members 16 are shown and these members are arranged with the enlarged peripheral portions 17 diametrically opposed and adapted for engagement with the inner surface 21 of the flange 15 of the driven member 13.

For normally urging the inertia members into frictional engagement with the driven member 13 I provide springs 22, one for each inertia member, adapted to be arranged in a slot 23 and bearing at one end against the end wall 24 of the said slot and at the other end against a stud or other stop 25 carried by the other inertia member. As illustrated a convenient construction consists in providing the stud 25 with a threaded portion 26 which engages a threaded aperture in the other inertia member, the head of the stud fitting in the corresponding slot 23. Thus the springs 22 act to normally urge the inertia members radially outwardly in opposed direction and into frictional engagement with the flange 15 of the driven member 13. It will be noted that while the inertia elements 16 are rotatable about a center which is coincident with the center of the crank shaft 10, nevertheless, these inertia members are not centered or supported at their center but are centered by reason of their peripheral engagement with the driven member.

The open side of the housing or casing formed by the driven member 13 may be closed by means of a cover 27 which may be conveniently secured in place by means of bolts 28 threaded into the hub portion 20. The driven member 13 may be provided with a pulley groove 29 for engagement by the customary fan belt.

By reference to Figure 3, the manner in which the inertia members 16 may be modified in order to regulate the action of centrifugal force will be described. Obviously each inertia member rotates about a center indicated by the reference character C and if each of these inertia members is perfectly balanced centrifugal force will have no effect in varying the pressure set up by the springs between the discs 16 and the driving member 13. If, however, the center of weight or mass of these inertia members is shifted to either side of the center of rotation C then the centrifugal force set up when the crank shaft is rotated can be used to either increase the spring pressure or to decrease the same. If, for instance, each inertia member 16 has a portion of the material thereof removed from one side of the center of rotation C as, for instance, by forming therein apertures 30 then the center of the weight or mass of the discs is shifted so that centrifugal force will act to increase the action of the springs 22. On the other hand if sufficient material is removed from each inertia member as, for instance, by aperturing the same as indicated at 31 (Figure 4) to locate the center of weight or mass on the other side of center C then centrifugal force will tend to oppose the action of springs 22. As a consequence of this it is possible to take advantage of centrifugal force to either increase or decrease the friction between the inertia member and the driving member as is found necessary to give the smoothest action.

From the foregoing it will be apparent to those skilled in this art that as a consequence of this invention it is possible to produce a vibration damping device wherein any degree of friction between the inertia members and the driven member can be obtained at high or low speeds by properly locating the centers of gravity of inertia members and by making the weight heavier or lighter on either side of their centers of rotation as is found to be desirable or expedient. Furthermore with this invention it is possible to center the inertia members on their outer surface or peripherally whereby wear occasioned thereto will be automatically compensated for and the parts will not wear loose and chatter.

While an embodiment of the invention has been described and illustrated herein somewhat in detail it will be readily apparent to those skilled in this art that many of the essential and all of the non-essential details may be altered without departing from the spirit and scope of this invention and to this end reservation is made to make such changes as may come within the purview of the accompanying claims.

What I claim as my invention is:

1. The combination with a shaft, of a vibration damper therefor, comprising a casing fixed to said shaft, inertia members in said casing rotatable about said shaft, and resilient means normally urging said inertia members radially whereby the outer peripheries thereof frictionally engage said casing to center the inertia members with respect to said shaft.

2. In a vibration damper, the combination with a shaft of an outer driven member fixed thereto, inertia members rotatable about said shaft, and means urging said inertia members in a direction whereby the outer peripheries thereof frictionally engage said outer member to center the inertia members with respect to said shaft.

3. In a vibration damper, the combination with a shaft of a member fixed thereto, a pair of inertia members rotatable about said shaft, and spring means normally urging said inertia members radially in opposed directions into engagement with said fixed member.

4. In a vibration damper, the combination with a shaft of a member fixed thereto provided with a laterally extending flange, a pair of inertia members rotatable about said shaft, and resilient means normally acting to urge said inertia members radially in opposed directions into peripheral frictional engagement with the flange of said fixed member.

5. The combination with a shaft, of vibration damping means therefor comprising a member fixed to said shaft, inertia members mounted in said first member, and springs normally acting to urge the outer peripheries of said inertia members radially into engagement with said first member to center the inertia members with respect to said shaft.

6. In a vibration damper, the combination with a shaft, of a driven member fixed thereto, inertia members rotatable about said shaft, and resilient means normally urging said inertia members radially outwardly whereby the outer peripheries of said inertia members frictionally engage said driven member to center said inertia members with respect to the shaft.

7. In a vibration damper, the combination with a shaft, of a member fixed thereto, inertia members rotatable about said shaft, means normally urging said inertia members into engagement with said first member, said inertia members being so balanced that centrifugal force acts to alter the action of said means and the frictional engagement between said inertia members and said first member.

8. In a vibration damper, the combination with a shaft of a member fixed thereto, inertia members rotatable about said shaft, spring means normally urging said inertia members into engagement with said first member, the centers of gravity of said inertia members being located so that centrifugal force acts to alter the action of said spring means as the speed of rotation of said shaft is varied.

9. In a vibration damper, the combination with a shaft, of a driven member fixed thereto, rotatable inertia members and resilient means normally urging said inertia members radially outwardly into frictional engagement with said driven member, the centers of gravity of said inertia members being so located that centrifugal force alters the action of said resilient means.

10. In a vibration damper, the combination with a shaft, of a driven member fixed thereto, rotatable inertia members, and resilient means normally urging said inertia members radially outwardly into frictional engagement with said driven member, the centers of gravity of said inertia members being so located with reference to their center of rotation that centrifugal force acts to control the frictional engagement thereof with said driven member in accordance with the speed of rotation of said shaft.

11. In a vibration damper, the combination with a shaft of a member fixed thereto, inertia members rotatable about said shaft, spring means normally urging said inertia members into frictional engagement with said first member, the centers of gravity of said inertia members being located so that centrifugal force acts to alter the action of said spring means in accordance with the speed of rotation of said shaft.

12. In a vibration damper, the combination with a shaft, of a driven member fixed thereto, inertia members rotatable about said shaft and centered with respect thereto by engagement of their outer peripheries with said driven member, and yieldable means to establish the engagement between said inertia and driven members.

13. In a vibration damper, the combination with a shaft, of a driven member fixed thereto and provided with an axially extending flange, inertia members rotatable about said shaft and centered with respect thereto by engagement of their outer peripheries with the flange of said driven member, and yieldable means for establishing the engagement between said inertia members and the flange of said driven member.

14. In a vibration damper, the combination with a shaft, of a member fixed thereto, a pair of inertia members rotatable about said shaft, and means normally urging said inertia members radially in opposite directions into engagement with said fixed member.

15. In a vibration damper, the combination with a shaft, of a member fixed thereto, a plurality of inertia members rotatable about said shaft, and means normally urging said inertia members radially in different directions into engagement with said fixed member.

In testimony whereof I affix my signature.

HORACE T. THOMAS.